Sept. 21, 1926.  
V. H. HARBERT  
1,600,817

RETAINING VALVE ANCHOR

Filed Sept. 8, 1925

Inventor  
Victor H Harbert  
By Edwin S Clarkson  
Attorney

Patented Sept. 21, 1926.

1,600,817

UNITED STATES PATENT OFFICE.

VICTOR H. HARBERT, OF SPRINGFIELD, ILLINOIS.

RETAINING-VALVE ANCHOR.

Application filed September 8, 1925. Serial No. 55,197.

Retaining valves are applied to cars to make movement of train safe, and to conserve the supply of air, and this valve, when set and in good working order, does not allow all of the air to escape from the brake cylinders, but retains a certain amount of pressure therein sufficient to hold the brakes in a set position, while the air is being replenished in the train line. When the air pressure in the line is increased or replenished, if the retaining valve is in an inoperative condition, the triple valve will automatically assume a released position allowing all of the air to escape from the brake cylinder, releasing the brakes, and allowing the train to gain momentum, and run out of control. It is, therefore, of the utmost importance that the retaining valve be in good working order at all times.

Retaining valves have in the past been secured to cars by lag screws and by bolts, the retaining valve being located on the outside at the end of the car and near the top of the car. When bolts are used, and this has been the most universal way of securing valves to the car, the bolts extend from the inside of the car, the nuts on the end of the bolt being on the outside of the car. This type of fastening has been found objectionable from many standpoints, in that the lag screws and bolts work loose to such an extent that the service movements of a car tend to give a sidewise movement to the retaining valve, which, with the pipe leading from the air brake system of the car, moves somewhat after the fashion of a pendulum. Such condition is prohibited by the United States safety appliance laws, inasmuch as it reduces the efficiency of the brake system, besides endangering the lives of trainmen. Another objection is that in case of bolts, the heads of which are on the inside of the car; if these bolts become loose during transit, the only way to get at the bolt is to unload the car, which can only be done at great expense, and sacrifices the safety of the goods removed from the car, and increases the liability of the railroad for damage and stolen goods.

Figure 1:
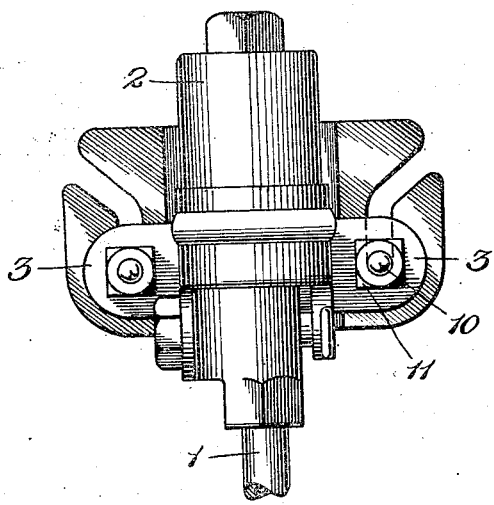
Figure 1 is a front elevation of a retaining valve secured to my improved anchor

The reference numeral (1) designates the air pipe to which the retaining valve (2) is secured, such retaining valve having lugs (3) which are provided with bolt openings as is usual with a retaining valve.

My improved bracket comprises a base (4) having suitable bolt openings (5) through which bolts or rivets pass to secure the bracket to a wall of the car. These bolts or rivets also pass through the wall of the car with the head of the bolt on the inside of the car.

Figure 3:
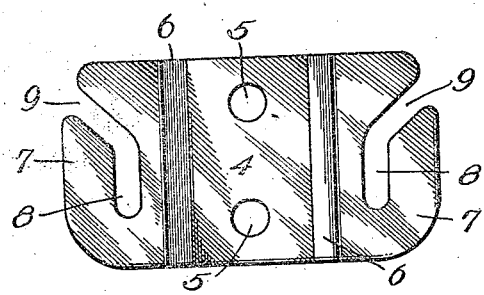
Figure 3 is a front elevation of my improved bracket.
Figure 4:
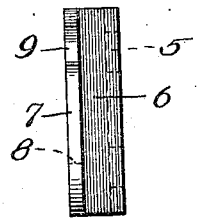
Figure 4 is an end elevation of Figure 3.
Figure 5:
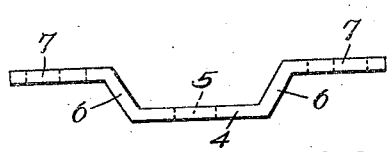
Figure 5 is a bottom plan view of Figure 3.

Extending forwardly from the base (4) are spacing elements (6) which diverge, and at the outer end of these spacing elements (6) I provide wings (7), said wings, when the bracket is secured to the car, being spaced from the wall of the car. These wings are provided with elongated slots (8) vertically disposed, which terminate at their upper ends in an obliquely disposed slot (9), the slots (9) being inclined toward and intercepting the side edge of the wings (9), as clearly shown in Figure 3.

Figure 2:
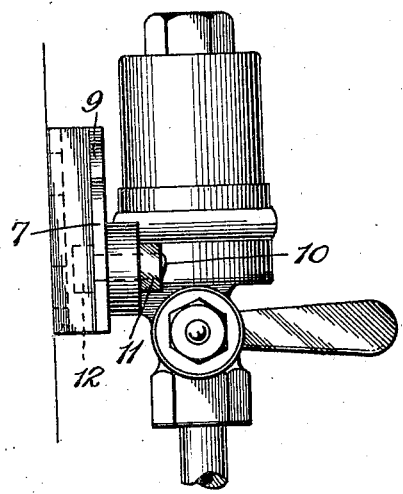
Figure 2 is a side elevation of Figure 1.

The bracket being secured to the wall of the car, the retaining valve is secured thereto by means of the bolts (10) and nuts (11), the head (12) of the bolt being positioned behind the wings (7), as more clearly shown in Figure 2.

In the event that the nuts (11) should become loosened under service conditions, it will be seen that the bolts (10) cannot be jolted out of the slots (8) because of the outwardly extending and oblique slots (9).

What I claim is:

1. A retaining valve anchor comprising a base and wings on each side of said base but in a different plane from the base.

2. A retaining valve bracket comprising a base, diverging arms from each side of said base, and wings extending outwardly from said arms and parallel with said base, and an elongated slot in said wings.

3. A retaining valve anchor comprising a base, outwardly diverging spacing members on each side of said base, wings extending from the outer end of said spacing members, and parallel with the base, and a vertically disposed elongated slot in each wing terminating at its upper end in an obliquely disposed slot opening at the side edges of said wings.

In testimony whereof I affix my signature.

VICTOR H. HARBERT.